United States Patent [19]
Taki

[11] Patent Number: 5,619,350
[45] Date of Patent: Apr. 8, 1997

[54] OPTICAL SCANNING DEVICE

[75] Inventor: Kazunari Taki, Nagoya, Japan

[73] Assignee: Brother Kogyo Kabushiki Kaisha, Nagoya, Japan

[21] Appl. No.: 391,181

[22] Filed: Feb. 21, 1995

[30] Foreign Application Priority Data

Feb. 22, 1994 [JP] Japan .................................. 6-024003

[51] Int. Cl.⁶ .............................. G02B 5/32; G02B 26/08
[52] U.S. Cl. .............................. 359/18; 359/17; 359/209; 347/260
[58] Field of Search ................................ 359/17, 18, 209, 359/566, 569, 571; 347/134, 256, 259, 260; 235/457

[56] References Cited

U.S. PATENT DOCUMENTS

| | | | |
|---|---|---|---|
| 4,747,646 | 5/1988 | Andrews | 359/18 |
| 5,182,659 | 1/1993 | Clay et al. | 359/17 |
| 5,238,785 | 8/1993 | Ohkura et al. | 430/321 |
| 5,253,087 | 10/1993 | Yang | 359/16 |
| 5,295,004 | 3/1994 | Hasegawa | 359/17 |
| 5,363,238 | 11/1994 | Akune et al. | 359/566 |

OTHER PUBLICATIONS

Yamagishi et al., "Holographic Straight Line Scanner for Laser Prints", Dec. 1986, pp. 416–426.
Hasegawa et al., "Straight–line scanning analysis of an all holographic scanner", Dec. 1989, pp. 5317–5325, vol. 28, No. 24.

Primary Examiner—Paul M. Dzierzynski
Assistant Examiner—Darren E. Schuberg
Attorney, Agent, or Firm—Oliff & Berridge

[57] ABSTRACT

An optical scanning device including a semiconductor laser and a scanning optical system which transmits a laser beam emitted from the semiconductor laser and scans the laser beam on a photosensitive drum. The scanning optical system includes at least one hologram having relief on at least one surface with the ratio h/P of the depth h and the minimum pitch P of the relief being set to about 1 or less in an area of the hologram surface the laser beam irradiates.

16 Claims, 8 Drawing Sheets

OPTICAL SCANNING DEVICE

BACKGROUND OF THE INVENTION

1. Field of the Invention

This invention relates to an optical scanning device using a hologram.

2. Description of Related Art

Figure 10:
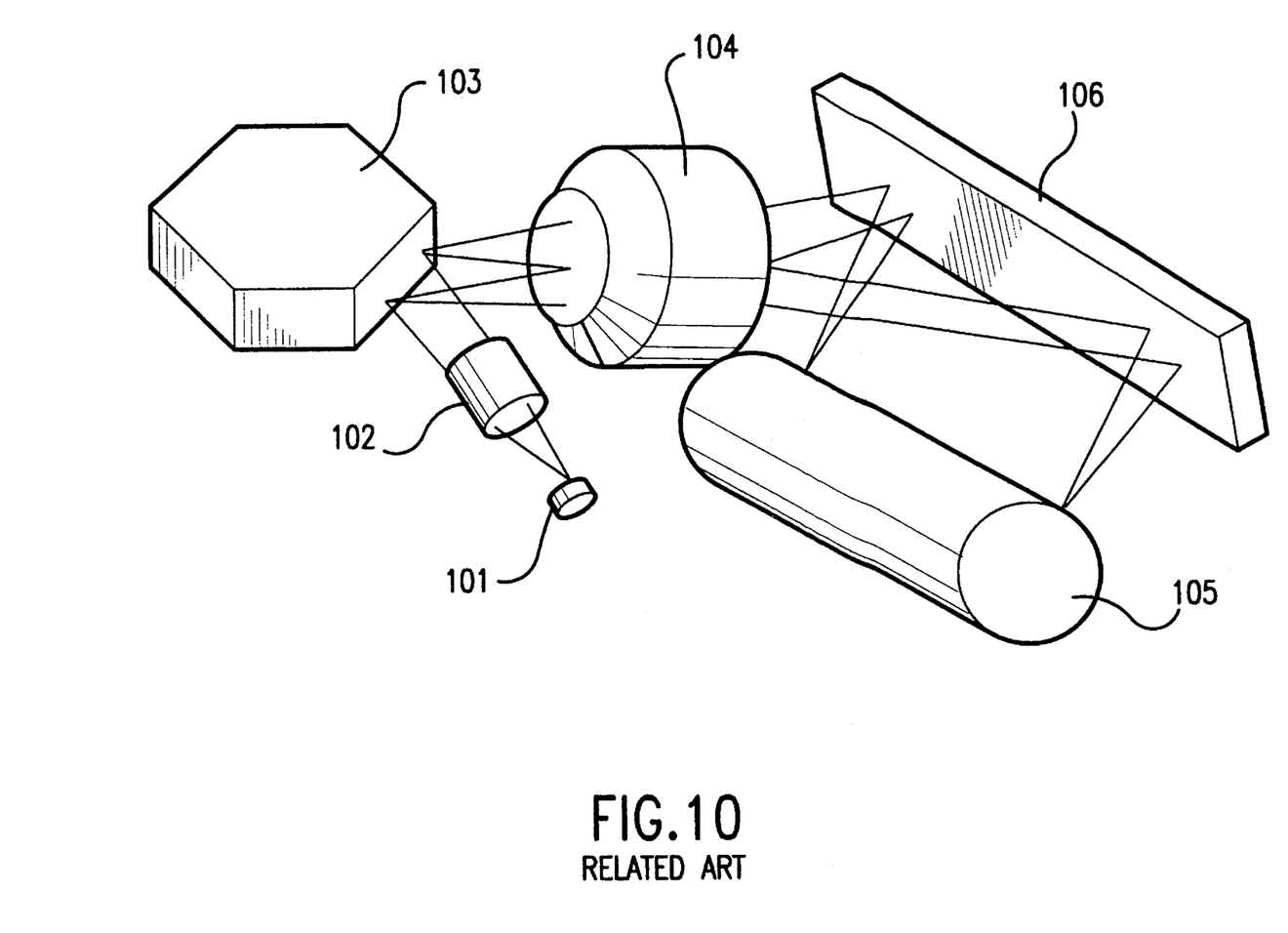
FIG. 10 is a perspective view showing a related art optical scanning device.

FIG. 10 shows one type of related art optical scanning device for modulating a laser beam in accordance with an image signal and irradiating the modulated laser beam onto a photosensitive medium to form an electrostatic latent image on the medium. The related art image forming device shown in FIG. 10 comprises a semiconductor laser 101, a collimator lens 102 for collimating a laser beam emitted from the semiconductor laser 101, a polygon mirror 103 for reflecting the collimated laser beam from the collimator lens 102 while rotating at high speed, an fθ lens 104 for converging the beam reflected from the polygon mirror 103 and a return mirror 106 for reflecting the beam from the fθ lens 104 to a photosensitive drum 105 to form an image on a photosensitive drum 105.

Figure 11:
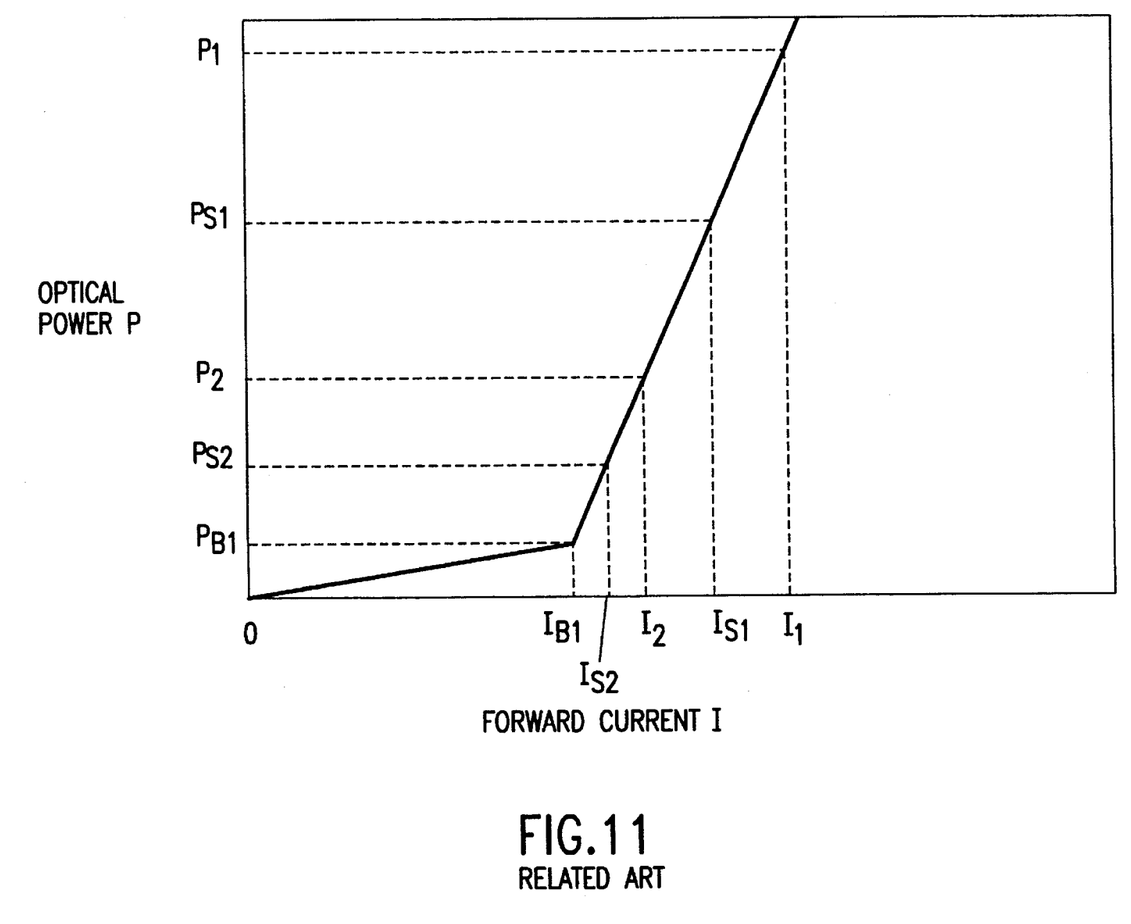
FIG. 11 is a diagram showing variation of an optical power characteristic with respect to a forward current of a semiconductor laser and the relationship between the optical power characteristic and each of the on-level and the off-level in the related art optical scanning device.

FIG. 11 shows the P-I (optical power vs. forward current) characteristic of the semiconductor laser 101 used in such a related art optical scanning device. As shown in FIG. 11, the P-I characteristic shows a faster increase in optical power with forward current as the forward current increases above a threshold current value of $I_{B1}$. The forward current at which the P-I characteristic changes is determined by the ambient temperature. In FIG. 11, the optical power output level $P_{S1}$ is the minimum power level at which an electrostatic latent image can be formed for a particular photosensitive medium. That is, upon irradiation of a laser beam having a power level above the latent image forming level $P_{S1}$ onto the photosensitive medium, the potential of a beam-incident area is reduced to such a level that development with toner can be performed (that is, toner can be attracted and attached to the area). Conversely, if the incident laser beam power is less than the latent image forming level $P_{S1}$, the potential reduction on the photosensitive medium is insufficient for toner to be attached to the beam-incident area.

Representing an optical power level which is high enough to reduce the potential on the photosensitive drum 105 to a toner-attachable level (hereinafter referred to as "on-level") by $P_1$, the current $I_1$ flowing at the optical power level $P_1$ is larger than the current $I_{S1}$ corresponding to the optical power $P_{S1}$. Additionally, a current whose value is near to the threshold current value $I_{B1}$ flows as a bias current into the semiconductor laser 101 to compensate for fluctuation of the optical power due to the temperature and to improve stability of an oscillation waveform. A weak optical power occurs with the bias current. This weak optical power $P_{B1}$ is not enough to reduce the potential on the photosensitive medium to the toner-attachable level. An optical power level which does not reduce the potential enough for toner to be attached is referred to as at the "off-level".

The optical power of the semiconductor laser 101 is switched between the on-level and the off-level in accordance with an image signal to form an electrostatic latent image on the surface of the photosensitive drum 105. The electrostatic latent image formed on the surface of the photosensitive drum 105 is developed with toner and then transferred onto a sheet.

When the photosensitive drum 105 has high sensitivity and an optical level at which the latent image can be formed is set to $P_{S2}$ which is lower than $P_{S1}$, the on-level is set to $P_2$ which is larger than $P_{S2}$. On the other hand, the off-level is not varied, that is, it is set to $P_{B1}$ because the bias current of the semiconductor laser 101 is set to a value near to the threshold value. However, even in an off-level area subject to the off-level power, toner attachment may occur and occurs more the lower the ratio of $P_{S2}$ to $P_{B1}$. Accordingly, since the ratio of the latent-image formable optical level $P_{S2}$ to the off-level $P_{B1}$ ($P_{S2}/P_{B1}$) is small when the photosensitive drum 105 has high sensitivity, the possibility of the toner attachment increases even when the optical power is at the off-level, so that toner may be attached to an area which is originally white on a reproduced image. Therefore the problem of fog is greater when the photosensitive drum has high sensitivity. Additionally, since the ratio of the on-level to the off-level ($P_2/P_{B1}$) is also small, there is also a problem that the contrast of a reproduced image is low.

Furthermore, even when the photosensitive drum 105 has high sensitivity, the on-level optical power setting remains at $P_1$ to prevent reduction in resolution due to excessive exposure. A light absorption filter is inserted into a transmission path of the laser beam to reduce the "fog" phenomenon and improve the contrast or the reflectivity of the return mirror 106 is reduced to reduce the optical power to $P_2$. However, in that case, optical elements such as a light absorption filter, etc. must be added, and a surface coating treatment must be provided to reduce the reflectivity of the return mirror 106. That increases the cost of the device.

SUMMARY OF THE INVENTION

An object of the present invention is to provide an inexpensive optical scanning device which is capable of preventing the "fog" phenomenon and is capable of excellent contrast.

In order to attain the above object, the optical scanning device according to the present invention includes a semiconductor laser and a scanning optical system for transmitting and scanning a laser beam from the semiconductor laser, wherein the scanning optical system includes a hologram having a portion with relief on at least one surface, and the depth h of the relief at an area of the hologram to which the laser beam is irradiated is smaller than the minimum pitch P of the relief in that area. The ratio of the depth to the minimum pitch P (h/P) is set to about 0.5 or less. The scanning optical system may have plural holograms.

In the optical scanning device according to the present invention, the laser beam emitted from the semiconductor laser is diffracted by the hologram with a relief surface portion, and the diffracted laser beam converges on a scanning surface. The imaging point on the scanning surface is linearly scanned. As described above, the laser beam is diffracted and converged by the relief of the surface of the hologram.

The diffraction efficiency is determined by the minimum pitch P and the depth h of the relief. When h/P is set to about 1, the diffraction efficiency is equal to about 50%, and when h/P is set to about 0.5, the diffraction efficiency is equal to about 15%. That is, the optical power from the semiconductor laser can be reduced by using a hologram to the scanning optical system. Particularly by reducing h/P or using plural holograms, the optical power on the scanning surface can be reduced without using additional optical elements or using a surface coating treatment.

DETAILED DESCRIPTION OF PREFERRED EMBODIMENTS

Preferred embodiments according to the present invention will be described hereunder with reference to the accompanying drawings.

Figure 1:
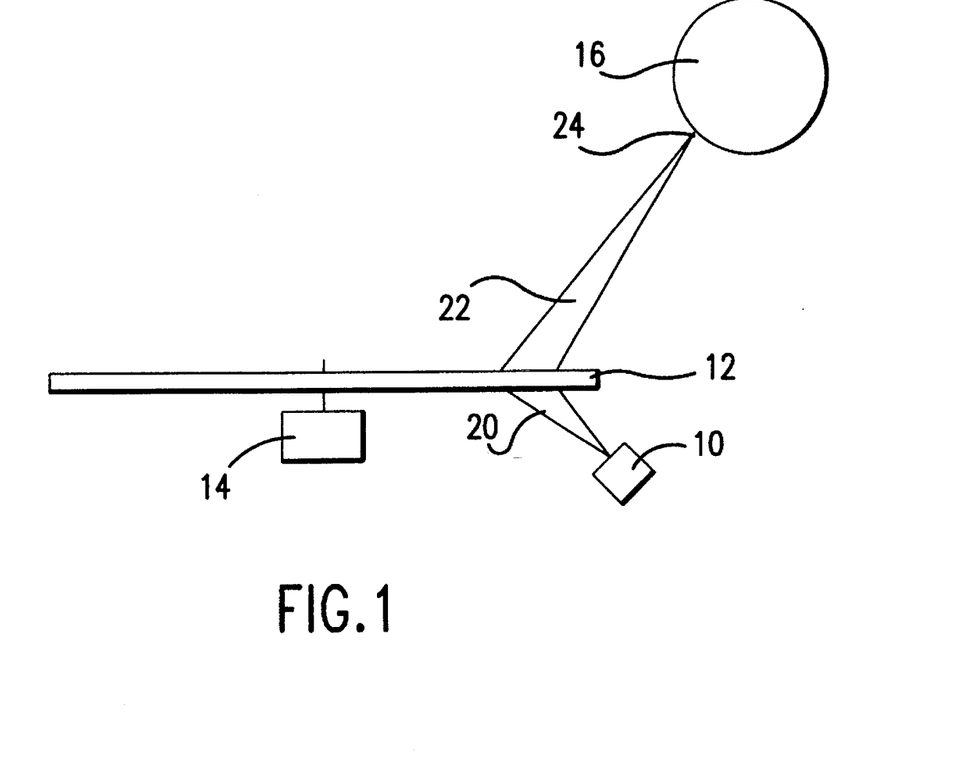
FIG. 1 is a side view of an electrostatic latent image forming device with a first embodiment of an optical scanning device of the present invention.

An electrostatic latent image forming apparatus with an optical scanning device of a first embodiment of the present invention will be described with reference to FIG. 1. As shown in FIG. 1, the electrostatic latent image forming apparatus includes a semiconductor laser 10, a scanning hologram 12, a rotational driving means 14 such as a motor or the like for rotating the scanning hologram 12, and a photosensitive drum 16. In the image electrostatic latent image forming apparatus shown in FIG. 1, a laser beam 20 emitted from the semiconductor laser 10 is incident on the scanning hologram 12. A semiconductor laser having an output power of about 3 to 5 mW may be used as the semiconductor laser 10. If the semiconductor laser has an output power of about 3 to 5 mW, the optical power at the surface of the photosensitive drum may be reduced to about 0.3 to 0.5 mW or less by the scanning optical system.

A hologram pattern which is required for the scanning and convergence of the laser beam is formed by relief on a surface of the scanning hologram 12. Accordingly, the laser beam 20 is diffracted by the scanning hologram 12, and it is transmitted as a diffracted beam and converges onto an imaging point 24 on the surface of the photosensitive drum 16. Through the rotation of the scanning hologram 12, the imaging point 24 is swept along the photosensitive drum 16.

Figure 2:
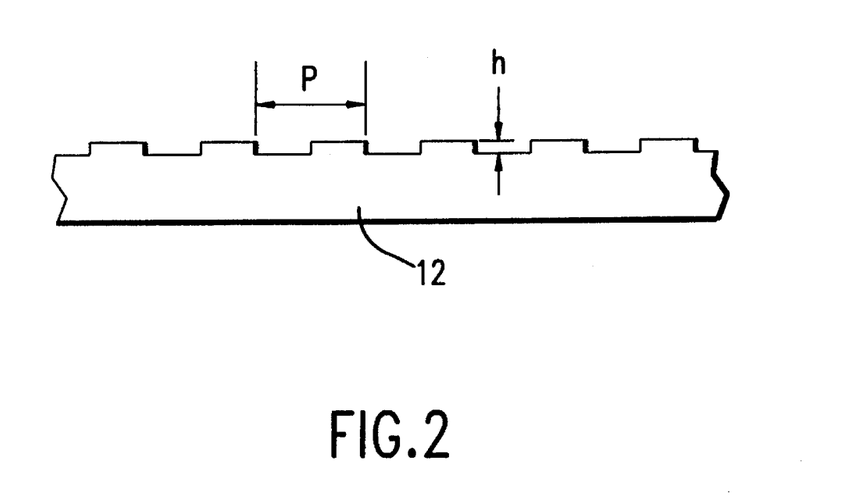
FIG. 2 is a cross-sectional view of a hologram which may be used in the optical scanning devices of the present invention.
Figure 3:
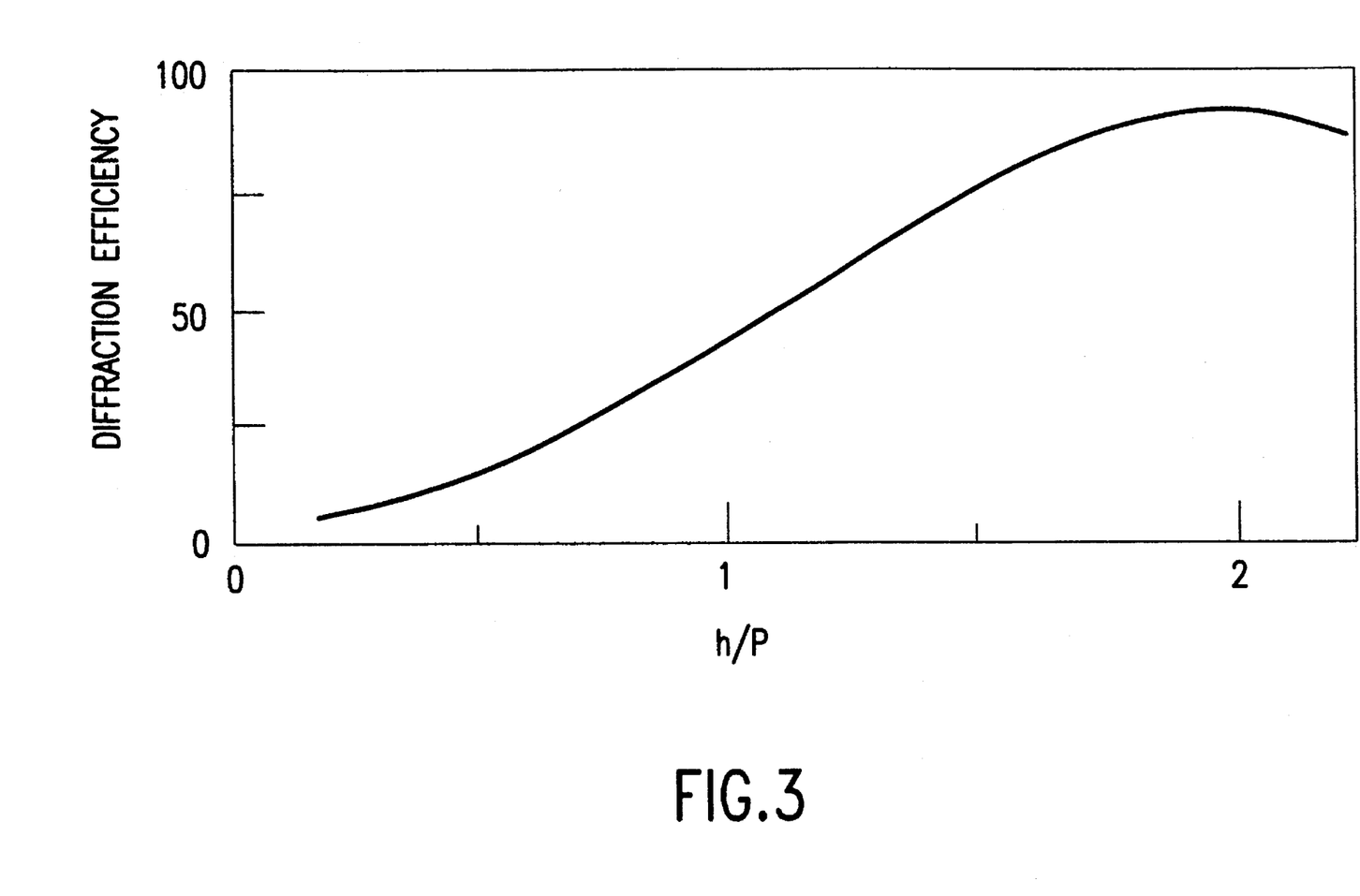
FIG. 3 is a graph showing the variation of diffraction efficiency with the ratio of the depth and pitch of the relief of a surface portion of the hologram.

FIG. 2 is a cross-sectional view of the hologram pattern formed on the scanning hologram 12. The hologram pattern is formed with relief on one surface. As described later, such a hologram pattern is formed through interference between two laser beams. The depth and the minimum pitch of the relief of the hologram pattern in the area of the hologram irradiated by the laser beam are represented by h and P. FIG. 3 shows the relationship between the diffraction efficiency and the ratio between the depth h and the minimum pitch P of the relief (h/P). The pitch P of the relief varies on the hologram surface. The diffraction efficiency is defined by the ratio of intensity of the diffracted light to the intensity of incident light. The diffraction efficiency of the hologram varies with the pitch of the relief and the refractivity of the material, and the ratio h/P which maximizes the diffraction efficiency is between 1.4 and 2.0. For example, in the case shown in FIG. 3, the diffraction efficiency is maximum for h/P=2, and 90% diffraction efficiency or more can be obtained. On the other hand, the diffraction efficiency is equal to about 50% for h/P=1 and it is reduced to about 15% for h/P=0.5.

A method of forming the hologram will be described with reference to FIGS. 4A to 4F.

Figure 4A:
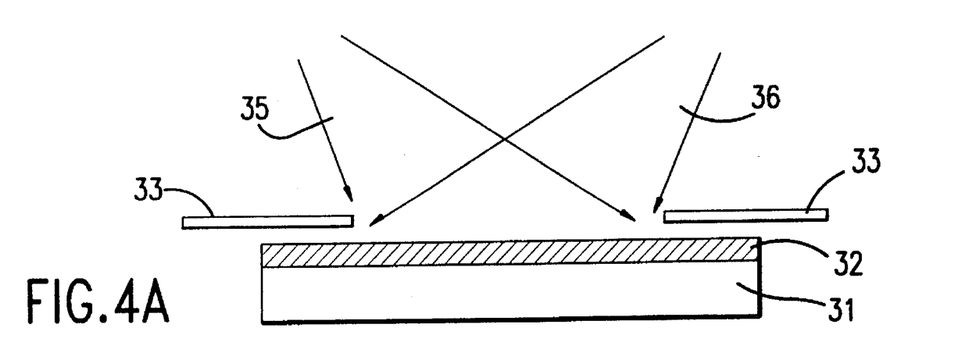
FIGS. 4A to 4F are cross-sectional views of the hologram, and show a process of manufacturing the hologram.
Figure 4B:
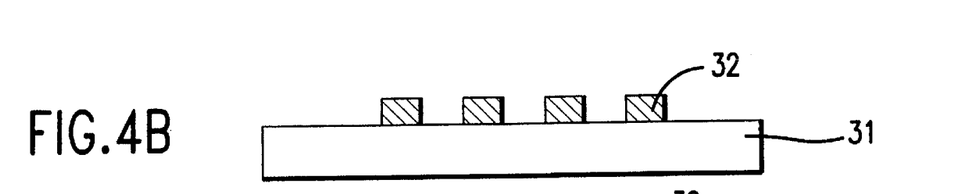
Figure 4C:
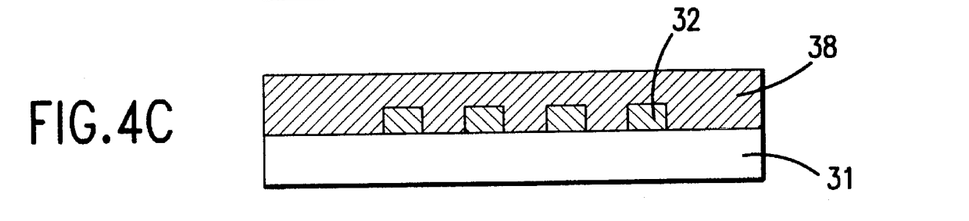
Figure 4D:
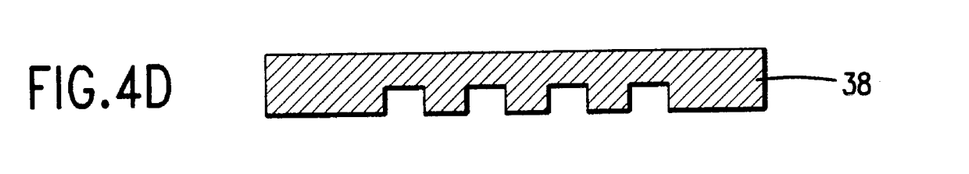
Figure 4E:
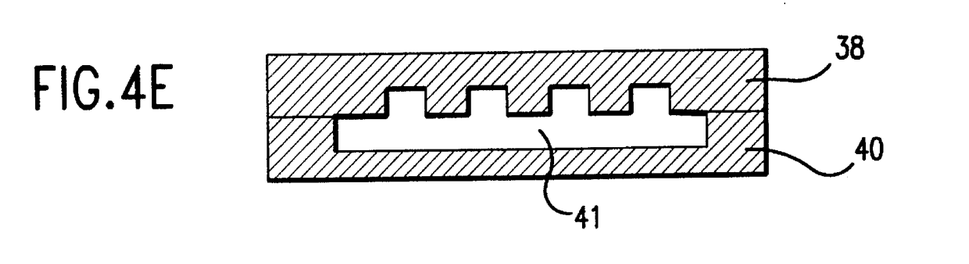
Figure 4F:
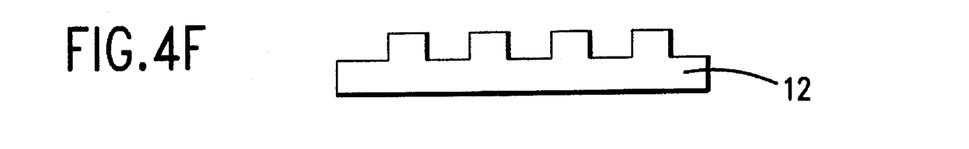

First, as shown in FIG. 4A, a photoresist 32 is coated on a substrate of glass or other material by a spin coating method, and then a laser beam having prescribed wave surface such as spherical wave, plane wave or the like, for example, He-Cd laser beams 35, 36 having 442 nm wavelength are irradiated onto the photoresist 32 to interfere with each other. At that time, exposure of the laser beams is performed through a mask 33 to expose a desired portion to the laser beams. After the exposure, a developing treatment is performed to form a hologram pattern of the photoresist 32 as shown in FIG. 4B. Subsequently, the hologram pattern thus formed is used as a master, and the master is subjected to an Ni-electroforming process as shown in FIG. 4C. After an Ni film 38 is formed on the surface of the master, the Ni-electroformed film 38 is exfoliated from the master as shown in FIG. 4D to form an Ni stamper 38 having a hologram pattern formed on the surface thereof. The stamper 38 is used as a part of a mold 40 and an injection molding process of injecting resin 41 into a space of the mold is performed to thereby form a scanning hologram 12 as shown in FIG. 4F.

Acrylic resin, polycarbonate resin, polyolefin or the like may be used for the injection molding process. As is apparent from FIG. 4A, the depth h of the relief on the scanning hologram 12 can be easily controlled by adjusting the thickness of the photoresist 32.

In the injection molding process, the molding failure rate increases for areas having a minimum pitch P of the relief of about 1 μm or less when h/P is greater than about 1. Therefore, productivity is remarkably reduced. On the other hand, when h/p is equal or less than about 1, preferably equal to or less than about 0.5 and more preferably the depth h is equal to or less than about 0.1 μm, the injection molding process is easier, and high productivity and low-cost can be achieved. The holograms thus formed are less expensive than the polygon mirror 103 and the fθ lens 104 which are used in the prior art, so that the electrostatic latent image forming device can be reduced in cost.

Figure 5:
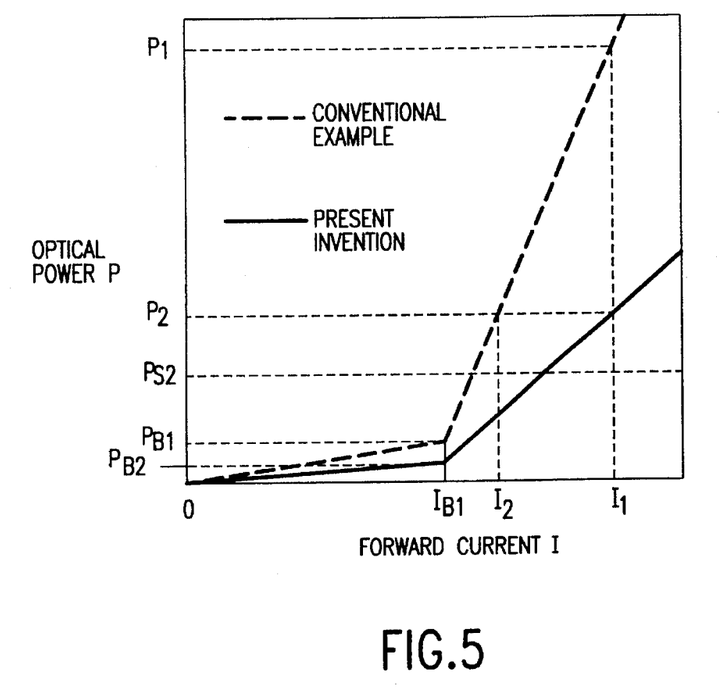
FIG. 5 is a diagram showing variation of an optical power characteristic with respect to a forward current of a semiconductor laser and the relationship between the optical power characteristic and each of the on-level and the off-level in the present invention and in a conventional device.

That is, the diffraction efficiency can be reduced by setting h/P equal to or less than about 1 or less, that is, by setting the height h of the projections to be about the same size or smaller than the pitch P of the projections. Therefore, the optimum optical power can be matched to the sensitivity of the photosensitive medium, and the device can be manufactured at low cost using the injection molding method. In that case, the power of the semiconductor laser 10 is kept to be $P_1$ as shown in FIG. 5, and the optical power of the laser beam emitted from the semiconductor laser 10 is adjusted to a proper value $P_2$ by the scanning hologram 12 based on the latent-image formable power level $P_{S2}$ of the photosensitive drum 16 used.

The scanning hologram 12 reduces the intensity of all the laser beams emitted from the semiconductor laser 10, and thus the off-level is also reduced to $P_{B2}$. Accordingly, the ratio of the latent-image formable optical level $P_{S2}$ to the off-level $P_{B2}$ ($P_{S2}/P_{B2}$) is larger, and thus toner attachment at the off-level is greatly reduced. Therefore, the "fog" phenomenon is substantially prevented. In addition, the ratio of the on-level $P_2$ to the off-level $P_{B2}$ is increased, and thus the contrast of a reproduced image is not lowered.

The pitch is varied in accordance with the position on the hologram but the above relation should be satisfied for the minimum pitch P in all of the region to which the laser beam 20 is irradiated.

This invention is not limited to the embodiment as described above, and many modifications may be made to the embodiments without departing from the subject matter of this invention.

Figure 6A:
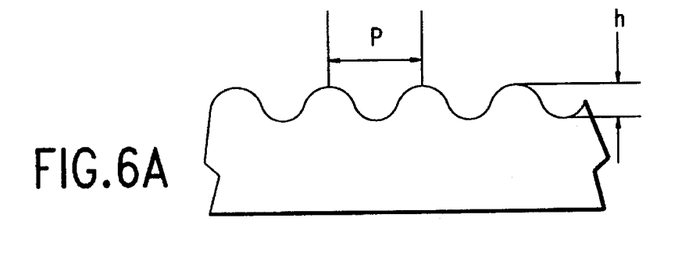
FIGS. 6A and 6B are cross-sectional views of different shapes of the relief portions of surfaces of holograms of the invention.
Figure 6B:
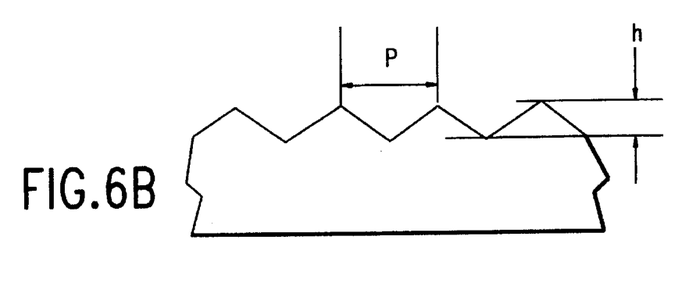

For example, in the above embodiment, the relief of the surface of the hologram is designed in a rectangular shape. However, the invention is not limited to this shape. For example, the relief may be of sine wave shape as shown in FIG. 6A or triangular or sawtooth as shown in FIG. 6B. These shapes may be achieved by reducing the irradiation light amount of the laser beam so that a photosensed region (a region to be actually exposed to the laser beam) of the photoresist 32 does not extend to the interface between the photoresist and the substrate. The selection of relief having sine waveform shape or triangular shape is made by adjusting the intensity distribution of interfering laser beams.

No restriction is imposed on the hologram pattern of the scanning hologram 12. For example, the hologram pattern may be obtained by interference of two spherical waves or interference of spherical wave and plane wave. Additionally, optical aberrations may be applied to the interfering wavefronts to achieve particular shapes of the relief. Alternatively, a computer generated hologram (CGH) may be used.

The photosensitive drum 16 may use an inorganic photosensitive medium of Se, amorphous silicon, CdS or the like, or an organic photosensitive medium which can be manufactured at low cost and in volume. Preferably, a function separation type organic medium in which a charge generating layer and a charge transfer layer are separately provided would be used for the photosensitive drum 16 to improve high sensitivity to the wavelength range of the semiconductor laser, and the optical power required on the photosensitive drum 16 may be sufficiently small, for example, below about 100 μW, to provide remarkably improved results with the invention. More preferably, the optical power of the photosensitive drum may be set to about 50 μW or less.

In the embodiment shown in FIG. 1, only one scanning hologram 12 is used. However, this invention is not limited to this embodiment, and plural holograms may be used.

Figure 7:
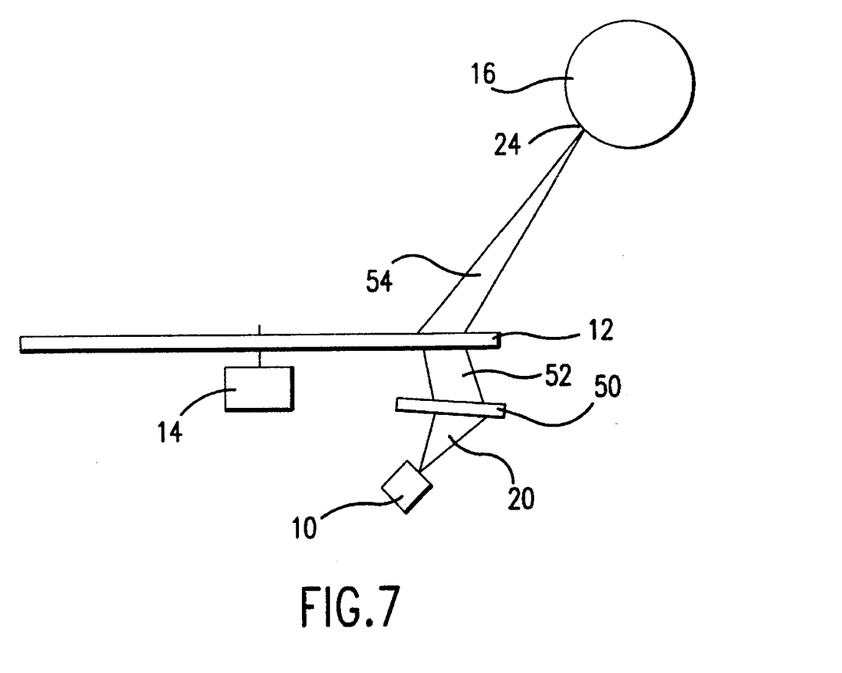
FIG. 7 is a side view of a second embodiment of an optical scanning device of the present invention.

For example, a fixed hologram element 50 may be provided between the semiconductor laser 10 and the scanning hologram 12 as shown in a second embodiment illustrated in FIG. 7. Since the wavelength of the laser beam used in the hologram pattern forming process show in FIG. 4 is generally different from that of the semiconductor laser 10 in the scanning operation shown in FIG. 1, aberration occurs in the diffracted light. Therefore, the spot diameter of the laser beam increases at the imaging point 24, and thus the resolution decreases. In order to prevent this phenomenon, the wavefront of light 20 emitted from the semiconductor laser 10 may be converted by element 50 to the wavefront of incident light 52 so that diffracted light 54 from the scanning hologram 12 has little aberration. With that construction, an electrostatic latent image forming device having high resolution can be provided.

By setting the ratio of the depth h and pitch P of the relief on the surface of the fixed hologram element 50 to 1 or less, the fixed hologram element 50 can be manufactured at low cost. In that case, by setting the output of the semiconductor laser 10 to 5 mW and setting the optical power on the surface of the photosensitive drum 16 to 100 μW or less, the efficiency of the whole scanning optical system is equal to 2% or less. Accordingly, the diffraction efficiency of each of the scanning hologram 12 and the fixed hologram element 50 is equal to 14% or less, and the value of h/P is about 0.5 or less on the basis of FIG. 3. The minimum pitch P is preferably in the range of about 0.4 μm to about 1.0 μm. More preferably, the minimum pitch P is in the range of about 0.5 μm to about 0.7 μm. A preferable value of h is less than or equal to about 0.1 μm.

The various values of the characteristics of the hologram are set to obtain an optimum result. For example, with a ratio of h/P of 0.5 or less, a minimum pitch P may be set to a value in the range of about 0.5 μm to about 0.7 μm with a value of h of less than or equal to about 0.1 μm and with an optical power on a scanning surface set to about 50 μW or less.

Therefore, the proper adjustment of the optical power on the surface of the photosensitive drum 16 and the improvement in productivity of the holograms 12, 50 by the injection molding providing low-cost performance can be achieved together. In that case, it is unnecessary to equalize the diffraction efficiency of the scanning hologram 12 with that of the fixed hologram element 50. For example, the value h/P of a scanning hologram 12 having a larger area may be set to be smaller than the value h/P of a fixed hologram element 50 to reduce the diffraction efficiency. Since injection molding for a hologram having a smaller value of h/P is easier, the scanning hologram having larger area can be manufactured with high productivity.

Figure 8:
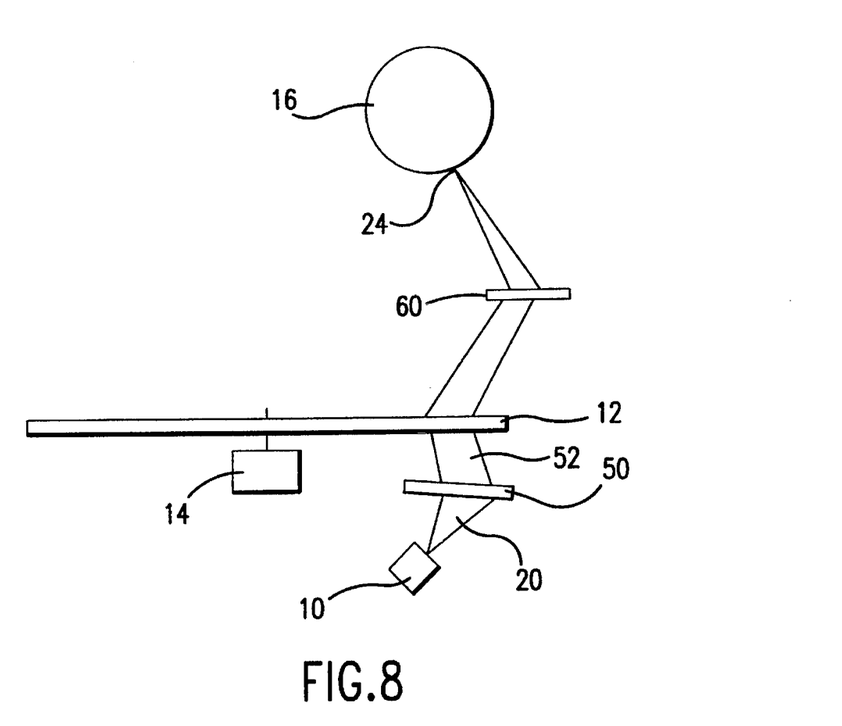
FIG. 8 is a side view of a third embodiment of an optical scanning device of the present invention.

Additionally, as shown in a third embodiment of 10 FIG. 8, a first fixed hologram element 50 and a second fixed hologram element 60 may be disposed between the semiconductor laser 10 and the scanning hologram 12 and between the scanning hologram 12 and the photosensitive drum 16, respectively. With that arrangement, compensation can be made for the deviation of the imaging point 24 on the photosensitive drum 16 due to fluctuation of wavelength of the semiconductor laser 10. By setting the output of the semiconductor laser 10 to 5 mW and setting the optical power required on the surface of the photosensitive drum between 16 to 70 μW or less, the efficiency of the whole scanning optical system is 1.4% or less, so that the diffraction efficiency of each of the three holograms is 24% or less. In this case, the value of h/P is smaller than 1 in the embodiment of FIG. 3, and the proper adjustment of the optical power on the surface of the photosensitive drum 16, the improvement of productivity of the holograms 12, 50 and 60 by the injection molding and the low-cost performance can be achieved together.

In FIG. 8, the first fixed hologram element 50 may be omitted. Additionally, like the embodiment of FIG. 7, it is not necessary to equalize the diffraction efficiency between the hologram 12, 50, 60.

Figure 9:
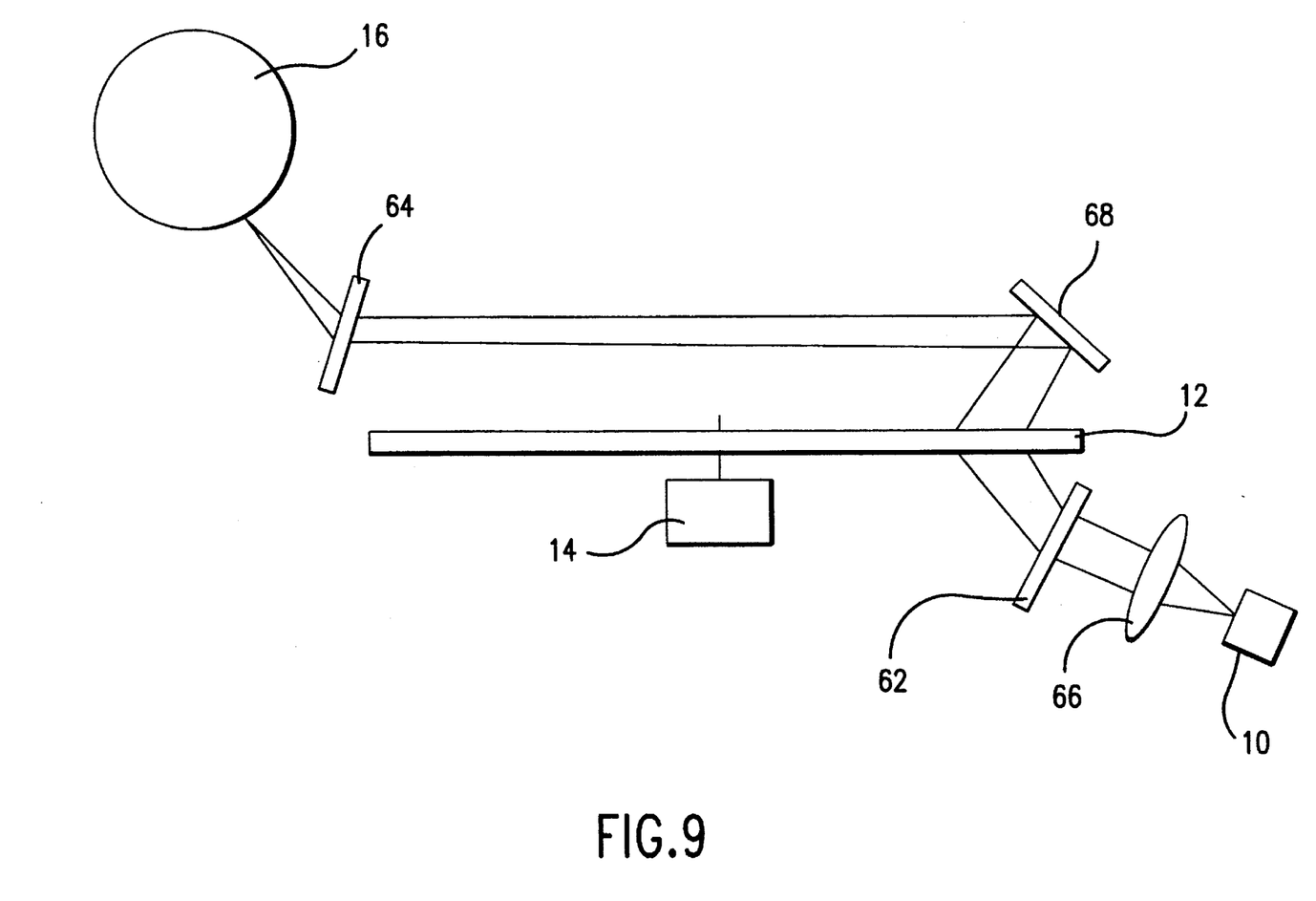
FIG. 9 is a side view of a fourth embodiment of an optical scanning device of the present invention.

Further, as described in the above embodiment, it is not necessary that the scanning optical system has only a hologram, but it may include other optical elements. For example, as shown in a fourth embodiment of the invention illustrated in FIG. 9, a spherical or an aspherical lens 66 may be disposed between the first fixed hologram element 62 and the semiconductor laser 10. Further, a return mirror 68 may be disposed between the second fixed hologram element 64 and the scanning hologram element 12.

As described above, various modifications may be made to the number and arrangement of holograms of the scanning optical system and the arrangement of the other optical elements, and this invention is not limited to the embodiments described above.

Still further, the relief is not necessarily provided on only one surface of the hologram. They may be provided on both surfaces of the hologram. The method of manufacturing the hologram is not limited to injection molding. For example, a so-called 2P method (photopolymerization method) may be used. In that method, a sheet or substrate coated with photopolymerization curable resin is closely contacted with a stamper and then exposed to ultraviolet rays to cure the resin, thereby forming copies. In the 2P method, the injection molding method is expensive if h/P is less than or equal to 1. However, copies can be extremely easily manufactured.

According to the optical scanning devices of this invention, the scanning optical system uses a hologram having a hologram pattern in which the ratio h/P of the depth h and the pitch P of the relief is set to be less than 1, to thereby reduce the optical power of the laser beam from the semiconductor laser and produce a proper exposure power on a photosensitive medium having high sensitivity. Therefore, the "fog" phenomenon can be prevented and excellent contrast can be obtained. Particularly by setting h/P to a sufficiently small value or using plural holograms, the optical power on the surface of the photosensitive medium can be set to the optimum exposure power for the high-sensitive photosensitive medium, for example, an optical power of about 100 µW or less. Mass production can be easily achieved by injection molding holograms having small h/P values. Thus the cost of the holograms can be greatly reduced. Accordingly, this invention can provide an inexpensive optical scanning device.

What is claimed is:

1. An optical scanning device including a semiconductor laser and a scanning optical system for transmitting a laser beam emitted from said semiconductor laser and scanning the laser beam, wherein said scanning optical system includes at least one hologram having relief on the surface thereof, a depth h of the relief being set to be smaller than a minimum pitch P of the unevenness of the relief in an area on said hologram to which the laser beam is irradiated, and wherein the optical power on a scanning surface is set to approximately 100 µW or less.

2. The optical scanning device as claimed in claim 1, wherein said scanning optical system has plural holograms.

3. The optical scanning device as claimed in claim 1, wherein a value h/P is set to about 0.5 or less.

4. An optical scanning device comprising a laser and a scanning optical system, wherein said optical system includes at least one hologram having an area to which a laser beam emitted by said laser is irradiated, said area having a relief of depth h, said relief having a minimum pitch P in said area, wherein a ratio of h/P is about 1 or less in said area and wherein an optical power on a scanning surface is set to about 100 µW or less.

5. The optical scanning system of claim 4, wherein said scanning optical system includes a plurality of holograms.

6. The optical scanning system of claim 4, wherein a ratio of h/P is about 0.5 or less in said area.

7. The optical scanning device of claim 6, wherein a value of h is less than or equal to about 0.1 µm in said area.

8. The optical scanning device of claim 7, wherein a value of P is in the range of about 0.4 µm to about 1 µm in said area.

9. The optical scanning device of claim 8, wherein a value of P is in the range of about 0.5 µm to about 0.7 µm in said area.

10. The optical scanning device of claim 9, wherein the optical power on a scanning surface is set to about 50 µW or less.

11. The optical scanning device of claim 10, wherein the relief is of sine wave shape.

12. The optical scanning device of claim 4, wherein the optical power on a scanning surface is set to about 50 µW or less.

13. The optical scanning device of claim 12, wherein the relief is of sine wave shape.

14. The optical scanning device of claim 12, wherein the relief is of triangular shape.

15. The optical scanning device of claim 4, wherein a value of h is less than or equal to about 0.1 µm in said area.

16. The optical scanning device of claim 15, wherein the optical power on a scanning surface is set to about 50 µW or less.

* * * * *